Patented June 20, 1933

1,914,872

UNITED STATES PATENT OFFICE

WILLIAM SMITH, JAMES PRIMROSE, AND JOHN THOMAS, OF GRANGEMOUTH, SCOTLAND, ASSIGNORS TO SCOTTISH DYES LIMITED, OF GRANGEMOUTH, SCOTLAND

MANUFACTURE OF DYESTUFF INTERMEDIATES OF THE ANTHRAQUINONE SERIES

No Drawing. Application filed April 7, 1930, Serial No. 442,470, and in Great Britain April 15, 1929.

This invention relates to the manufacture of intermediates for the production of dyestuffs.

It is more especially directed to the manufacture of anthraquinone-1-chlor-2-carboxylic acid but in arriving at this manufacture processes or intermediate steps may be involved which may be employed by themselves.

In British Specification No. 207,840 there has been described among other things a process for the manufacture of 1-chlor-2-methyl-anthraquinone which consists in the chlorination of 2-methyl anthraquinone in weak oleum for example, oleum of strength not over about 20% and treatment of the resulting product with water.

The object of the present invention is principally to provide an improved or modified process of this kind.

We have therefore made investigations and as a result have discovered the surprising fact that notwithstanding the knowledge that chlorinations and brominations are normally carried out at comparatively high temperatures and very rarely below ordinary room temperatures, chlorination in processes such as referred to above takes place readily at low temperatures for instance in the neighbourhood of 0° C. By selecting such temperatures, say temperatures of the order 0° C. and not higher than about 15° C., advantages are obtained. For instance, we find that in chlorinating at higher temperatures, although the product consists substantially of 1-chlor-2-methyl-anthraquinone it is liable to be mixed with other isomers which do not contain the chlorine in the 1-position. By using this lower temperature the proportion of isomers formed is much decreased, while the proportion of 1-chlor-2-methyl-anthraquinone is increased. The resulting product is therefore much more suitable as an intermediate in the production of pyranthrone or the like, for which purpose entry of the halogen into any position other than the 1-position is valueless.

This 1-chlor-2-methyl-anthraquinone is also much more valuable for the production of the 1-chlor-2-carboxylic acid of anthraquinone as an intermediate in the production of Caledon Red BN (anthraquinone: 1:2-naphthacridone).

The process is especially useful in connection with the one stage conversion of 4'-methyl-2-benzoyl benzoic acid to the 1-chlor-2-carboxylic acid of anthraquinone, as described in British Specification No. 207,840.

The invention in brief consists in a process for the manufacture of 1-chlor-2-methyl anthraquinone which comprises the chlorination of 2-methyl-anthraquinone in weak oleum, for example, oleum of strength not over about 20% in which the chlorination is effected at temperatures in the neighbourhood of 0° C. and not higher than about 15° C.

The invention also consists in a process as indicated above applied to the one stage conversion of 2-methyl-anthraquinone to 1-chlor-2-carboxylic acid of anthraquinone.

The invention also consists in the application of 1-chlor-2-methyl-anthraquinone such as may be made by the processes of either of the preceding two paragraphs in the production of pyranthone or the like, anthraquinone-1:2-naphthacridone and the like.

The invention also consists in processes substantially as herein described and in products including 1-chlor-2-methyl-anthraquinone substantially free from isomers which do not contain the chlorine in the 1-position when made by processes as herein described or by the obvious chemical equivalents thereof.

The following examples illustrate how the invention may be carried into effect, references to parts and percentages being to parts and percentages by weight:—

Example 1

130 parts of 2-methyl-anthraquinone and 4 parts of iodine are dissolved in 1300 parts of 3.5% oleum, chlorine is then passed in at the rate of 6 parts per hour with stirring while the temperature is still kept at 12° C. About 45 parts of chlorine are added in all, and as soon as the last of the chlorine is in stirring is continued for 2 or 3 hours longer and a sample taken and analyzed. If the chlorine content is below the theoretical value a further quantity may be added. The exact amount of chlorine necessary depends to a slight extent on the apparatus used, and after one or two chlorinations have been carried out it is no longer necessary to test a sample to see when chlorination is complete. After chlorination, the sulphuric acid solution is poured into 13,000 parts of water, boiled, allowed to settle, the supernatant liquor siphoned off, the remainder filtered, washed with a little 1% soda ash, finally with water and dried.

Example 2

14 parts 4'-methyl-2' benzoyl-benzoic acid are sprinkled into 130 parts 5% oleum, and the mixture is then heated up to 110° C. and kept at this temperature for 3 hours and then cooled. Sufficient 23% oleum is added to bring the strength of the oleum up to 3.5-4% free sulphur trioxide. 1.3 parts iodine are added and chlorine is passed into the charge which is kept at 0° C. until the chlorine content of the product is about 13.8%.

The charge is then blown into sufficient water to dilute the acid to about 5% sulphuric acid, boiled, filtered, washed acid free and dried.

General

The invention is not limited to the above examples nor to processes as described in British Specification No. 207,840.

Having now described our invention, what we claim as new and desire to secure by Letters Patent is:—

1. A process for the manufacture of 1-chlor-2-methyl anthraquinone which comprises the chlorination with chlorine gas of 2-methyl-anthraquinone in weak oleum, of a maximum strength about 20% using a small quantity of iodine as a catalyst, the chlorination being effected at temperatures in the neighbourhood of 0° C.

2. A process in accordance with claim 1 applied to the one stage conversion of 2-methyl-anthraquinone to 1-chlor-2-carboxylic acid of anthraquinone.

3. The process which consists in the chlorination of 130 parts of 2-methyl-anthraquinone and 4 parts iodine dissolved in 1300 parts of about 4% oleum and about 45 parts of chlorine passed in at temperatures between 0° C. and 12° C.

4. A process for the manufacture of 1-chlor-2-methyl-anthraquinone which consists in dissolving about 130 parts of 2-methyl-anthraquinone and about 4 parts iodine in about 1300 parts of substantially 4% oleum and 45 parts of chlorine at about 12° C.

In testimony whereof we have signed our names to this specification.

WILLIAM SMITH.
JAMES PRIMROSE.
JOHN THOMAS.